TORQUE OUTPUT OF POWER MOTOR

POSITION OF FOLLOW-UP RELATIVE TO CORRESPONDENCE

Inventor:
John L. Bower,
by Harry E. Dunham
His Attorney.

Patented Sept. 17, 1946

2,407,866

UNITED STATES PATENT OFFICE 2,407,866

CONTROL SYSTEM

John L. Bower, Schenectady, N. Y., assignor to General Electric Company, a corporation of New York Application July 23, 1941, Serial No. 403,699

7 Claims. (Cl. 172—239)

This invention relates to control systems, more particularly to follow-up control systems for driving an object into positional agreement with a pilot device, and it has for an object the provision of a simple, reliable and improved control system of this character.

In the operation of follow-up systems, it frequently occurs that when the system is not in use and is disconnected from the power system, the pilot device is moved out of positional correspondence with the driven object by a large amount. When the follow-up system is reconnected with the power system for the purpose of resuming operation, a very large synchronizing torque is developed in a direction to restore the system to synchronism, i. e., to return the driven object toward correspondence with the pilot device. The initial positional disagreement may be so large that the synchronizing torque will be of sufficient magnitude to cause the driven object to be driven toward positional agreement at such a high velocity as to result in overshooting and a subsequent condition of hunting or oscillation about the position of correspondence. Such a condition is of curse highly undesirable.

In order to minimize this undesirable condition, means are provided which are responsive to positional disagreement of the pilot device and driven object in excess of a predetermined value for reducing the synchronizing torque substantially below the value that would otherwise be developed for such positional disagreement.

Follow-up systems of the character described are provided with suitable antihunting means for preventing hunting during normal operation of the system. One form of such antihunting means utilizes a capacitor for modifying the control of the driving means during the normal operation of the system. However, during the operation of synchronizing the system from a large initial positional disagreement, the ability of the capacitor to prevent hunting leaves much to be desired. For the purpose of providing an improved control during such synchronizing operation, means are provided which are responsive to speeds of the driving means in excess of a predetermined value for by-passing the capacitor and supplying a control voltage to the controlling means for the driving means for modifying the control of the driving means in accordance with the speed of the driving means during the period that the speed of the driving means exceeds a predetermined value.

Figure 1:
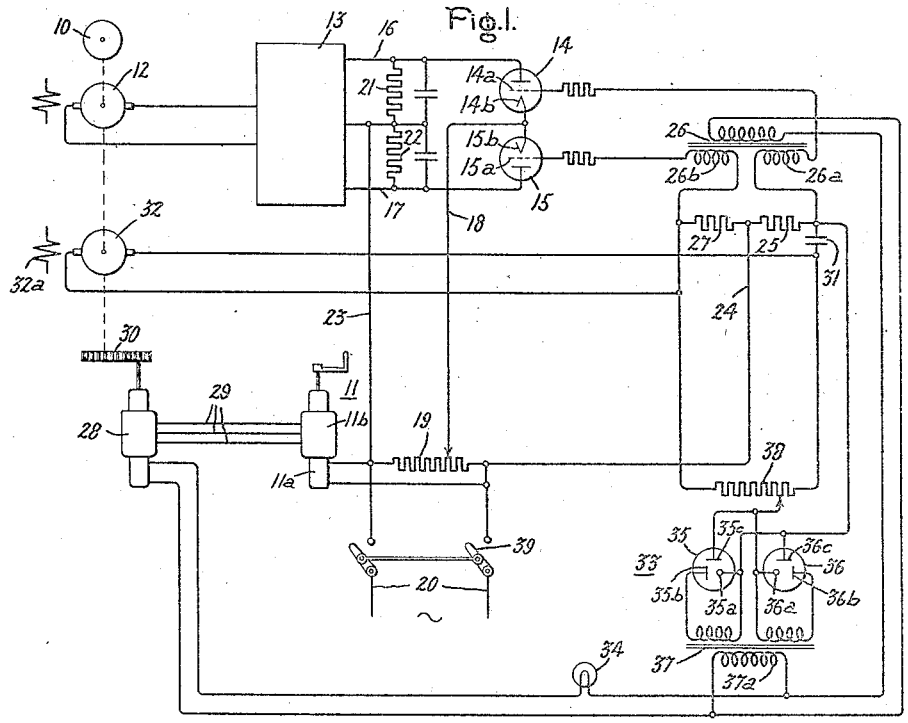
Figure 2:
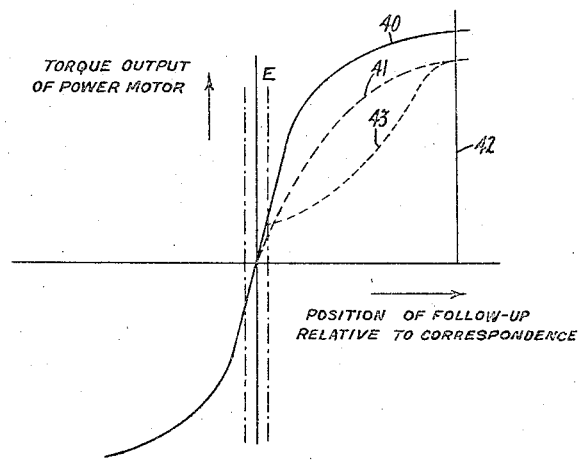

In illustrating the invention in one form thereof, it is shown as embodied in a follow-up or torque amplifying system in which the driven object is driven by an electric motor under the control of suitable means for producing a signal voltage dependent upon the positional disagreement of the pilot device and driven object. For a better and more complete understanding of the invention, reference should now be had to the following specification and to the accompanying drawing of which Fig. 1 is a simple, diagrammatical representation of an embodiment of the invention, and Fig. 2 is a chart of characteristic curves which serve to facilitate an understanding of the operation of the invention.

Referring now to the drawing, a massive object 10 which may be a searchlight, a gun, a gun director or other object is to be driven in positional agreement with a pilot or control device 11 by suitable driving means such, for example, as represented by the direct current electric motor 12 to the drive shaft of which the driven object 10 is connected by means of suitable reduction gearing (not shown). Direct current is supplied to the armature of the motor 12 by means of a suitable power amplifier 13 and is under the control of a pair of electric valves 14, 15.

The power amplifier 13 may be of any suitable type. For example, it may be an electric valve type amplifier, or it may be a dynamoelectric machine amplifier such as an armature reaction excited dynamoelectric machine. Since the specific structure of the power amplifier per se does not constitute a part of this invention, it is represented conventionally in the drawing. If the power amplifier 13 should be of the electric valve type, it would preferably have two separate conducting paths each controlled by a separate grid and these control grids would be connected by means of conductors 16 and 17 to the anodes of the electric valves 14 and 15. On the other hand, if the amplifier is of the dynamoelectric machine type, it would preferably be provided with a pair of control field windings and these field windings would be connected by means of conductors 16 and 17 to the anodes of the electric valves 14 and 15. The electric valves 14 and 15 may be of any suitable type but they are preferably vacuum triodes of the "hard" tube type. The cathodes of the valves 14 and 15 have a common connection 18 to an intermediate point of an adjustable voltage divider 19 which is connected across a suitable source of alternating voltage represented by the two supply lines 20. A pair of resistors 21 and 22 is connected across the anodes of the valves 14 and 15, and the junction point of these two resistors is connected by means of conductor 23 to one side of the source of alternating voltage 20. The cathode grid circuit of the electric valve 14 extends from the cathode through conductor 16 and the right-hand portion of voltage divider 19 through conductor 24, stabilizing resistor 25, and the right-hand secondary winding of input transformer 26 to the grid of the valve 14. Similarly, the cathode grid circuit of the electric valve 15 extends from the cathode to the conductor 24 by the circuit previously traced and thence through stabilizing resistor 27 and the left-hand secondary winding of the input transformer 26 to the grid of valve 15. The voltages of the grids $14_a$ and $15_a$ with respect to the cathodes $14_b$ and $15_b$, respectively, as a result of the inclusion of a portion of the voltage divider 19 in the anode-cathode circuit of the valves are such that both valves normally conduct equal amounts of current. This condition of equal conduction in both valves 14 and 15 occurs when the follow-up system is in correspondence, i. e., when the driven object 10 is in positional agreement with the pilot device 11, and the velocity of the driven object 10 is unchanging.

In order to vary the bias voltages of the grids $14_a$ and $15_a$ of the valves 14 and 15, respectively, a component voltage of variable magnitude is supplied to the grid circuit substantially in phase with the anode voltages of these valves through the input transformer 26 whose secondary windings $26_a$ and $26_b$ are connected in the cathode grid circuits of the electric valves 14 and 15, as explained in the foregoing, and whose primary winding is connected to the single phase alternating current source 20 through suitable rotary induction apparatus illustrated as comprising the pilot device 11 which is referred to as a transmitter and the rotary induction device 28 referred to as the receiver regulator. The rotary induction device 11 comprises a rotor member $11_a$ provided with a single phase winding (not shown) connected across the single phase source 20, and a stator member $11_b$ provided with a distributed three-element winding (not shown) that is physically similar to the polyphase winding of a wound rotor induction motor. The stator and rotor windings are arranged in inductive relationship with each other so that the alternating magnetic field owing to the current flowing in the primary winding induces voltages in the winding element of the secondary winding. The receiver regulator 28 is in all respects identical with the transmitter 11, and the terminals of its stator winding are connected to the terminals of the stator winding of the transmitter by means of conductors 29 so that the voltages induced in the stator winding of the transmitter cause current to flow in the stator winding of the receiver regulator, thereby producing a magnetic field similar to the magnetic field produced by the current flowing in the rotor winding of the transmitter. Rotation of the rotor member of the transmitter causes a voltage to be induced in the rotor winding of the receiver owing to the shift in the position of the axis of the magnetic field of the receiver regulator relative to the axis of the coil of the rotor member, and the magnitude of this induced voltage depends upon the relationship of the axis of this winding to the axis of the magnetic field, e. g., when the axes of the magnetic fields and of the rotor winding are parallel, the induced voltage is maximum, whereas when these axes are at right angles with each other, the induced voltage is zero. It will therefore be clear that the rotation of the rotor of the transmitter or of the receiver regulator will vary the magnitude of the component voltage supplied to the grid circuit of the electric valves 14 and 15 which, in turn, will result in a variation in the relationship of the current flowing in the valves 14 and 15. This will ultimately result in causing the amplifier 13 to supply current in one direction or the other to the armature of the driving motor 12. The grid connections to the electric valves 14 and 15 are so made, as explained in the foregoing, that when the signal voltage supplied to the primary winding of the input transformer is varied, the voltage applied to the grid of one of the valves is increased, and the voltage applied to the grid of the other valve is simultaneously decreased. Consequently, when the current through one of the valves is increased, the current through the other valve is simultaneously decreased. As a result of the increase in current flowing through one of the valves and the decrease in current flowing in the other valve, the amplifier 13 is caused to supply direct current to the armature of motor 12 in one direction or the other depending upon whether the current is increased in the valve 14 or the valve 15.

The rotor member of the receiver regulator 28 is connected through suitable gearing 30 to the shaft of the driving motor 12.

For the purpose of preventing hunting during the normal follow-up operation of the system, that is to say, during operation other than synchronizing the system from a condition of large angular disagreement between the pilot device and driven object, a suitable electrical energy storage device such, for example, as a capacitor 31 is connected in series relationship with the stabilizing resistors 25 and 27 across the terminals of a tachometer generator 32 which is driven by the driving motor 12 and generates a voltage substantially linearly proportional to the speed of the motor 12. As a practical alternative, the capacitor 31 might be connected in series with the stabilizing resistors 25 and 27 across the armature terminals of the drive motor 12, since the countervoltage of the drive motor 12 is approximately proportional to its speed under most normal operating conditions. It is preferred, however, to utilize the tachometer generator 32. This generator may either be provided with a field winding $32_a$ as shown, or it may be of the permanent magnet type. The charge on the capacitor 31 varies as the voltage of the generator 32 varies, which is to say that the charge on the capacitor varies as the speed of the driving motor 12 varies. When the speed of the driving motor 12 and the voltage of the generator 32 are constant, the charge on the capacitor is constant and when the voltage of the tachometer generator is varying at a high rate, the charge on the capacitor is likewise varying at a high rate. When the charge on the capacitor is varying, a current is caused to flow through the resistors 25 and 27 which is proportional to the rate at which the charge on the capacitor is varying. In other words, the current caused to flow in the stabilizing resistors is proportional to the rate of change of the charge on the capacitor which, in turn, varies in accordance with the rate of change of the voltage of the tachometer generator, and therefore, to the rate of change of speed of the motor 12. Thus, the capacitor 31 introduces a correcting influence or voltage in the grid circuit of the electric valves 14 and 15 which is proportional to the rate of change of speed of the driving motor 12.

The polarity of the connections of the capacitor 31 is such that the variations in the current flowing through the stabilizing resistors 25 and 27 are out of phase and leading with respect to any incipient hunting of the driven object about the position of correspondence. The effect is of transiently varying the current supplied to the driving motor 12 so that the amount of current that is actually supplied to the motor 12 is different from the amount that would be supplied for any positional disagreement of the pilot device and driven object in the absence of the capacitor 31. In general, when the system is approaching correspondence, the effect produced by the capacitor is to reduce the current supplied to the motor below the value of current that would otherwise be supplied to the motor for any given error. However, if the system is approaching correspondence at a very high velocity, the current supplied to the motor 12 may even be reversed and a braking torque thereby produced to prevent overshooting.

For the purpose of effectively controlling the operation of the system when synchronizing from a condition of large initial error, additional synchronizing means is provided which comprises electric valve apparatus 33 and a variable voltage drop device 34. The electric valve apparatus 33 comprises a pair of electric valves 35 and 36 of the gas containing triode type. Electric valve 35 has a cathode 35a and a starting anode 35b connected across one of the secondary windings of the synchronizing transformer 37 whose primary winding 37a is connected across the primary winding of the input transformer 26 so as to be responsive to the signal voltage that is supplied from the receiver regulator 28 to the input transformer. The valve 35 also has a main anode 35c which together with the cathode 35a is connected across the capacitor 31. The electric valve 36 is in all respects identical with the electric valve 35 and, as shown, it has a cathode 36a and a starting anode 36b which are connected across the terminals of the other secondary winding of the transformer 37a. The main anode 36c and the cathode 36a are also connected across the capacitor 31. A potentiometer 38 is connected across the terminals of the tachometer generator 32.

The electric valves 35 and 36 are so designed that when the voltage between the cathodes and the starting anodes reaches or exceeds a predetermined value, such for example as 90 volts, conduction takes place between the cathodes and the starting anodes. This conduction will continue until the voltage across the cathodes and starting anodes is reduced to some considerably lower predetermined value, such for example as 60 volts. If at the same time there is a positive voltage on the main anodes 35c or 36c, conduction will also take place between the main anode and the cathode. The triode valves 35 and 36 are so designed that conduction does not take place between the main anodes and the cathodes unless the voltage supplied from the tachometer generator 32 equals or exceeds a predetermined value corresponding to a predetermined speed of the driving motor 12.

The cathode of each of the valves 35 and 36 is connected to the main anode of the other valve, so that regardless of the direction of operation of the system, there will be a conducting path from the potentiometer 38 to the junction point of the capacitor 31 and the stabilizing resistors 25 and 27.

The voltage drop device 34 may be of any suitable type. An ordinary incandescent lamp has been found to give very good results.

With the foregoing understanding of the elements and their organization in the completed system, the operation of the system itself will readily be understood from the following detailed description:

Assuming that the switch 39 is closed to connect the follow-up system to the power source 20 and that the driven object 10 is in correspondence with the pilot device 11, the system will be in the synchronized condition in which it is illustrated. As previously pointed out, when in this condition, both valves 14 and 15 are conducting equal amounts of current so that the net output of the power amplifier 13 to the driving motor 12 is zero. Manual rotation of the pilot device 11 effects a corresponding rotation of the magnetic field of the stator of the receiver regulator 28 so that a voltage is induced in the rotor winding of the receiver regulator approximately proportional to the amount of rotation of the pilot device 11. This induced voltage is applied to the grid circuit of the electric valves 14 and 15 and results in increasing the current flowing in one of the valves, e. g. the valve 14 and in decreasing the current flowing in the valve 15. This results in causing a current to be supplied to the motor 12 in such a direction that the motor is caused to rotate in a direction to drive the object 10 toward correspondence with the pilot device 11. As the object 10 approaches correspondence with the pilot device, the signal voltage supplied through the input transformer 26 to the grid circuit of the electric valves 14 and 15 decreases and becomes zero when the condition of correspondence is reached, thereby cutting off the supply of current to the driving motor 12. The operation just described may be considered to be the normal follow-up operation of the system.

If the switch 39 should be opened to disconnect the follow-up system from the power source 20, the synchronizing force between the driven object and pilot device 11 would disappear. While in this condition the rotor of the pilot device 11 may coast or easily be moved to a new position such that a large positional disagreement exists between the driven object and pilot device. This condition may and frequently does arise during normal use of the system.

If now the switch 39 should be reclosed to resume normal operation, a large signal voltage would be induced in the secondary winding of the receiver regulator 28 and supplied through the transformer 26 to the grid circuit of the electric valves 14 and 15, and a large current would be supplied to the driving motor 12. This current would produce an excessively large synchronizing torque which would not only restore the driven object 10 to a position of correspondence with the pilot device 11 but would actually cause the driven object to overshoot the position of correspondence and initiate a series of oscillations.

If the synchronizing means 24 and 35 were omitted, the relationship between the torque of the driving motor and error of the system, i. e., position of the driven object 10 away from correspondence, would be as indicated on curve 40 in Fig. 2 in which ordinates represent torque output of the driving motor and abscissae represent the error or amount out of correspondence.

With the connections from the main anodes of the gas triode valves 35 and 36 to the capacitor 31 removed, the voltage drop in the incandescent lamp 34 is sufficient to reduce the torque of the driving motor for each value of error as represented by the broken curve 41. In describing this operating condition it is assumed that the error is of such magnitude as to cause voltages to be induced in the secondary windings of the synchronizing transformer 37 of sufficient magnitude to cause conduction to take place between the cathodes and the starting anodes of the valves 35 and 36. In Fig. 2 the amount of error existing at the time of closing the switch 39 is represented by the abscissa of vertical line 42.

With the connections between the main anodes 35c and 36c of the valves 35 and 36 to the capacitor 31 intact, which is the condition illustrated in the drawing, the torque of the driving motor 12 for each value of error is represented by the dotted curve 43. This further modification of the torque results from the variation in grid voltage of valves 14 and 15 produced by conduction between the main anodes and cathodes of valves 35 and 36 in response to the voltage of tachometer generator 32. Since the voltage of tachometer generator 32 is zero at the instant of the closing of switch 39, zero current is conducted between the main anodes and cathodes of valves 35 and 36 and therefore the curves 41 and 43 coincide at the point of intersection with the vertical line 42. Consequently at the instant of closing the switch 39, the motor 12 develops a synchronizing torque proportional to the ordinate of the intersection of the curve 41 with the vertical line 42. In other words, at the instant of closing the switch 39, only the voltage drop across the incandescent lamp 34 is instrumental in reducing the torque of the driving motor.

However, the motor 12 comes up to speed quickly and the tachometer generator 32 generates a voltage which is sufficient to cause conduction between the main anode and cathode of one of the valves 35 or 36, and the magnitude of the current so conducted increases as the speed of the motor 12 increases. As the voltage of the tachometer generator 32 increases, the increasing current through the stabilizing resistors 25 and 27 resulting from the conduction through one or the other of the valves 35 and 36 causes the torque of the driving motor 12 to be decreased in accordance with the curve 43. In other words, during this operating condition, the torque of the driving motor is reduced by two effects: (1) The reduction of the torque as a result of the voltage drop in the incandescent lamp, and (2) the voltage from the tachometer generator applied through one or the other of the gas triode valves to the stabilizing resistors 25 and 27.

As the driven object 10 approaches correspondence with the pilot device 11, the signal voltage supplied from the receiver regulator 28 to the input transformer 26 decreases until finally at an error E the signal voltage decreases below the critical value which is required to support conduction between the starting anodes of the valves 35 and 36 and the cathodes. By this time the speed of the driving motor has been so reduced that the voltage generated by the tachometer generator 32 is insufficient to support conduction between the main anodes of the valves 35 and 36 and the cathodes.

When the valves 35 and 36 cease conduction both through the starting and main anodes, the synchronizing circuit ceases to operate and the follow-up system then returns to normal operation. The remaining operation of the system as the driven object 10 approaches the position of correspondence with the pilot device is in accordance with the curve 40.

During normal follow-up operation, the system is unaffected by the synchronizing circuit as long as the speed of the driving motor does not rise to a value such that the adjustment of the potentiometer 30 causes conduction to take place between the cathodes and main anodes of the gas triode valves 35 and 36, or as long as the error does not exceed the critical value at which conduction is initiated between the starting anodes and cathodes of these valves.

Although in accordance with the provisions of the patent statutes this invention is described as embodied in concrete form and the principle thereof has been explained together with the best mode in which it is now contemplated applying that principle, it will be understood that the elements and apparatus shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A follow-up control system comprising in combination a pilot device, a driven object, an electric motor for driving said object, means responsive to positional disagreement of said pilot device and driven object for producing a control voltage proportional to said disagreement, means responsive to said control voltage for supplying a variable voltage to said motor thereby to cause said motor to develop a torque proportional to said voltage to drive said object toward correspondence with said pilot device, and means responsive only to positional disagreement of said pilot device and driven object in excess of a predetermined amount for reducing said control voltage thereby to reduce the synchronizing torque of said motor.

2. A follow-up control system for a pilot device and driven object comprising in combination driving means for said object, a control circuit operatively connected to said driving means, means responsive to positional disagreement of said pilot device and driven object for supplying to said control circuit a signal voltage varying with said positional disagreement thereby to cause said driving means to produce a torque corresponding in magnitude to the amount of said disagreement to drive said object toward correspondence with said pilot device, a voltage drop device in said control circuit, an electric discharge device connected to said circuit and responsive only to a control voltage in excess of a predetermined value for completing a current conducting path to produce a voltage drop across said voltage drop device thereby to decrease said signal voltage and reduce the synchronizing torque of said driving means.

3. A follow-up control system for a pilot device and driven object comprising in combination driving means for said object, a control circuit operatively connected to said driving means, means responsive to positional disagreement of said pilot device and driven object for supplying a signal voltage to said circuit to cause said driving means to drive said object toward correspondence with said pilot device, a voltage drop device connected in said control circuit, means for reducing the synchronizing torque of said driving means comprising an electric discharge device connected to said circuit and responsive to a predetermined value of said control voltage for completing a current conducting path to produce a voltage drop across said voltage drop device thereby to decrease said signal voltage and means responsive to the speed of said driving means for further modifying the torque of said driving means.

4. A follow-up control system for a pilot device and driven object comprising in combination driving means for said object, means for controlling the energization of said driving means comprising electric valve apparatus provided with a control grid, means responsive to positional disagreement of said pilot device and driven object for supplying to said grid a signal voltage varying with said positional disagreement to control said driving means to drive said object toward correspondence with said pilot device, means responsive to a speed of said driving means in excess of a predetermined value for modifying the voltage supplied to said grid in accordance with said speed, and means responsive to said signal voltage in excess of a predetermined value for substantially decreasing the signal voltage thereby to reduce the synchronizing torque of said driving means.

5. A follow-up control system for a pilot device and driven object comprising in combination driving means for said object, means for controlling the energization of said driving means comprising electric valve means provided with a control grid, means responsive to positional disagreement of said pilot device and driven object for supplying a signal voltage to said grid to control said driving means to drive said object toward correspondence with said pilot device, antihunting means comprising an energy storage device connected to said grid and means for supplying a voltage to said energy storage device proportional to the speed of said driving means thereby to modify the voltage supplied to said grid, means responsive to positional disagreement of said pilot device and driven object in excess of a predetermined amount for substantially decreasing said signal voltage, and means responsive to a speed of said driving means in excess of a predetermined value for rendering said energy storage device ineffective.

6. A follow-up control system for a pilot device and driven object comprising in combination driving means for said object, means for controlling the energization of said driving means comprising electric valve apparatus provided with a control grid, means responsive to positional disagreement of said pilot device and driven object for supplying a signal voltage to said control grid to control said motor to drive said object toward correspondence with said pilot device, antihunting means comprising a capacitor connected to said grid and means for supplying to said capacitor a second voltage proportional to the speed of said driving means thereby to modify the voltage applied to said grid in accordance with the rate of change of speed of said driving means, means responsive to said signal voltage in excess of a predetermined value for substantially decreasing said signal voltage, and means responsive to said second voltage in excess of a predetermined value for by-passing said capacitor so that said grid voltage is modified in accordance with the speed of said driving means when the speed of said driving means is greater than a predetermined value.

7. A follow-up control system for a pilot device and driven object comprising in combination driving means for said object, means for controlling the energization of said driving means comprising electric valve apparatus provided with a control grid, means responsive to positional disagreement of said pilot device and driven object for producing a signal voltage varying with said disagreement, electrical connections from said disagreement responsive means to said grid for applying said voltage to said grid to control said driving means to drive said object toward correspondence with said pilot device, antihunting means for said system comprising a capacitor connected to said control grid and means for supplying a second voltage to said capacitor proportional to the speed of said driving means, a variable voltage drop device included in said connections, means for substantially reducing said signal voltage comprising an electric valve device having a cathode and an anode connected to said connections and responsive to a voltage in excess of a predetermined value for completing a conducting path thereby to produce an increased voltage drop across said voltage drop device, said electric valve device having a second anode coacting with said cathode in response to a predetermined value of said second voltage to complete a by-pass circuit about said capacitor thereby to render said capacitor ineffective.

JOHN L. BOWER.